United States Patent [19]

Hari

[11] Patent Number: 5,298,609

[45] Date of Patent: Mar. 29, 1994

[54] DISAZO COMPOUNDS CONTAINING CYCLOALKYL ESTER OR CYCLOALKYLAMIDE GROUPS

[75] Inventor: Stefan Hari, Reinach, Switzerland

[73] Assignee: Ciba-Geigy Corporation, Ardsley, N.Y.

[21] Appl. No.: 92,023

[22] Filed: Jul. 14, 1993

Related U.S. Application Data

[63] Continuation of Ser. No. 909,837, Jul. 7, 1992, abandoned.

[30] Foreign Application Priority Data

Jul. 11, 1991 [CH] Switzerland ................ 2064/91

[51] Int. Cl.$^5$ .................. C09B 33/147; C09B 33/153; D06P 3/79
[52] U.S. Cl. .................. 534/748; 534/575; 534/598; 534/734; 534/746; 534/820; 534/874
[58] Field of Search ................ 534/748

[56] References Cited

U.S. PATENT DOCUMENTS

| | | | |
|---|---|---|---|
| 3,137,686 | 6/1964 | Dietz et al. ................ | 534/801 |
| 3,562,249 | 2/1971 | Schnaebel et al. ................ | 534/820 |
| 4,003,886 | 1/1977 | Muller ................ | 534/575 |
| 4,065,448 | 12/1977 | Müller ................ | 534/649 |
| 4,070,353 | 1/1978 | Cseh et al. ................ | 534/748 |
| 4,689,403 | 8/1987 | Ronco ................ | 534/820 |
| 4,719,293 | 1/1988 | Ronco ................ | 534/575 X |
| 4,946,948 | 8/1990 | Hari et al. ................ | 534/651 |

FOREIGN PATENT DOCUMENTS

| | | | |
|---|---|---|---|
| 0041605 | 12/1981 | European Pat. Off. | |
| 0095442 | 11/1983 | European Pat. Off. | |
| 2032601 | 1/1971 | Fed. Rep. of Germany | |
| 7217063 | 6/1973 | Netherlands ................ | 534/820 |
| 1318574 | 5/1973 | United Kingdom | |
| 1406860 | 9/1975 | United Kingdom ................ | 534/820 |

OTHER PUBLICATIONS

Ronco, Chemical Abstracts, vol. 100, No. 105098Z (1983).
Derwent Abstract 91225 D/50 (May, 16, 1980).

*Primary Examiner*—Mary C. Lee
*Assistant Examiner*—Fiona T. Powers
*Attorney, Agent, or Firm*—JoAnn Villamizar; George R. Dohmann; Luther A. R. Hall

[57] ABSTRACT

Compounds of formula I

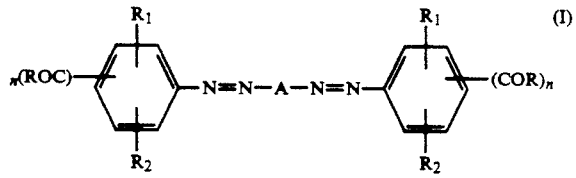

wherein R is a radical of formula $-OR_3$ or $-NHR_3$, A is a radical of formula II or III

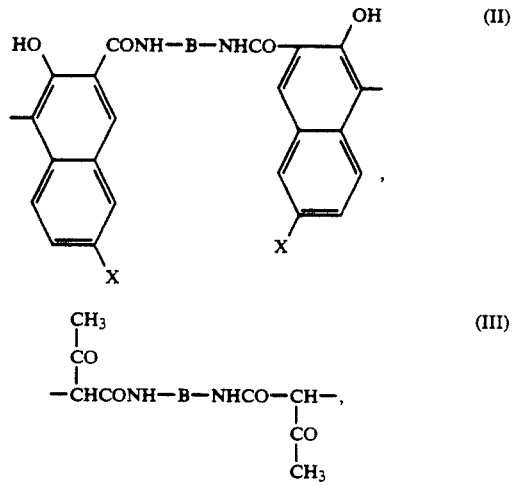

and B is a radical of formula (Abstract continued on next page.)

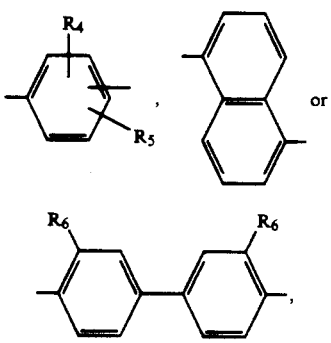

wherein
n is 1 or 2,
$R_1$ is —H or —Cl,
$R_2$ is —H, halogen, —NO$_2$, —CN, $C_1$-$C_4$alkyl, $C_1$-$C_4$alkoxy, —CF$_3$, $C_2$-$C_5$alkoxycarbonyl, —CONH—phenyl, —NHCO-phenyl or phenoxy, each unsubstituted or substituted in the phenyl nucleus by one or two chlorine atoms or by one or two methyl, methoxy or ethoxy groups, $R_3$ is $C_5$-$C_{12}$cycloalkyl, which is unsubstituted or substituted by 1 to 3 $C_1$-$C_4$alkyl or $C_5$-$C_6$cycloalkyl groups, $R_4$ and $R_5$ are each independently of the other —H, halogen, —NO$_2$, —CN, —CF$_3$, $C_1$-$C_4$alkyl or $C_1$-$C_4$alkoxy, $R_6$ is —H, —Cl, —Br, —CH$_3$ or —OCH$_3$, and X is —H, —Br, —OCH$_3$, —CN or —NO$_2$, are suitable for use as pigments, especially for colouring polyolefins.

2 Claims, No Drawings

DISAZO COMPOUNDS CONTAINING CYCLOALKYL ESTER OR CYCLOALKYLAMIDE GROUPS

This application is a continuation of application Ser. No. 07/909,837, filed Jul. 7, 1992 now abandoned.

The present invention relates to novel disazo compounds containing cycloalkyl ester or cycloalkylamide groups and to the use thereof for colouring high molecular weight organic material, especially polyolefins.

Azo pigments which contain ester groups have long been known in the art. Red disazo pigments are disclosed, inter alia, in U.S. Pat. Nos. 3,137,688 and 4,689,403, while yellow disazo compounds are disclosed, inter alia, in U.S. Pat. Nos. 4,003,886 and 4,065,448. A principal feature of these compounds is that they contain at least four alkyl ester groups, each alkyl containing a maximum of 4 carbon atoms. Disazo compounds which contain long-chain alkyl ester or alkylamide groups are disclosed in U.S. Pat. No. 4,946,948. Monoazo pigments containing a cycloalkyl ester group are also known, inter alia from EP-A 41 605. Disazo pigments containing alkylamide groups are disclosed in U.S. Pat. No. 3,562,249.

Although these products have good allround pigment properties, they do not in all respects meet the current requirements of the pigment art for specific applications.

Surprisingly, it has now been found that disazo pigments containing at least two cycloalkyl ester or cycloalkylamide groups are very suitable for colouring high molecular weight organic material, especially polyolefins, and at the same time have enhanced dispersibility, a reduced tendency to blooming and excellent pigment properties. A surprising feature of the novel disazo pigments which contain 2 or more cycloalkyl groups is that they are substantially faster to light, weathering and acid than the monoazo pigments which contain only one cycloalkyl radical.

Accordingly, the invention provides compounds of formula I

wherein R is a radical of formula —OR$_3$ or —NHR$_3$, A is a radical of formula II or III

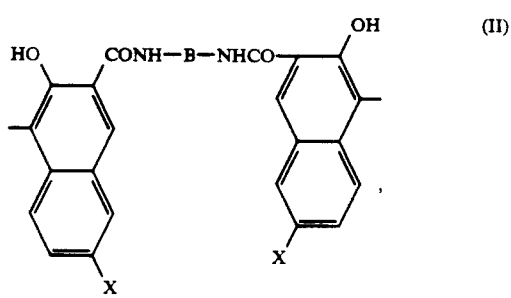

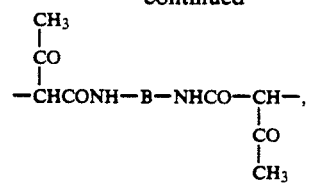

and B is a radical of formula

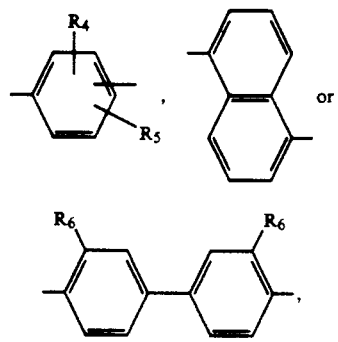

wherein
n is 1 or 2
R$_1$ is —H or —Cl,
R$_2$ is —H, halogen, —NO$_2$, —CN, C$_1$-C$_4$alkyl, C$_1$-C$_4$alkoxy, —CF$_3$, C$_2$-C$_5$alkoxycarbonyl, —CONH—phenyl, —NHCO—phenyl or phenoxy, each unsubstituted or substituted in the phenyl nucleus by one or two chlorine atoms or by one or two methyl, methoxy or ethoxy groups,
R$_3$ is C$_5$-C$_{12}$cycloalkyl, which is unsubstituted or substituted by 1 to 3 C$_1$-C$_4$alkyl or C$_5$-C$_6$cycloalkyl groups,
R$_4$ and R$_5$ are each independently of the other —H, halogen, —NO$_2$, —CN, —CF$_3$, C$_1$-C$_4$alkyl or C$_1$-C$_4$alkoxy,
R$_6$ is —H, —Cl, —Br, —CH$_3$ or —OCH$_3$, and
X is —H, —Br, —OCH$_3$, —CN or —NO$_2$.

Halogen in the above groups will be taken to mean fluoro, bromo and, preferably, chloro.

C$_1$-C$_4$Alkyl is methyl, ethyl, n-propyl, isopropyl, n-butyl, isobutyl and tert-butyl.

R$_2$, R$_4$ and R$_5$ as C$_1$-C$_4$alkoxy will typically be methoxy, ethoxy, n-propoxy, isopropoxy, n-butoxy and tert-butoxy.

R$_2$ as C$_2$-C$_5$alkoxycarbonyl may be methoxycarbonyl, ethoxycarbonyl, n-propoxycarbonyl, isopropoxycarbonyl, n-butoxycarbonyl and tert-butoxycarbonyl.

R$_3$ as unsubstituted or C$_1$-C$_4$alkyl - or C$_5$-C$_6$cycloalkyl-substituted C$_5$-C$_{12}$cycloalkyl may be cyclopentyl, cyclohexyl, 1-, 2- or 3-methylcyclopentyl, cycloheptyl, 1-, 2-, 3-, cis-4- or trans-4-methylcyclohexyl, 1-ethylcyclopentyl, 3,3-dimethylcyclopentyl, cyclooctyl, 1-, 2-, 3- or 4-ethylcyclohexyl, 2,4-dimethylcyclohexyl, 2,6-dimethylcyclohexyl, 1-n-propylcyclopentyl, 1-n-propyl-, 1-isopropyl- or 4-isopropylcyclohexyl, 2,4,6-trimethylcyclohexyl, α-, cis-2- or trans-2-decalyl, trans-4-cyclohexylcyclohexyl, 4-tert-butylcyclohexyl or cyclododecyl. Cyclohexyl is preferred.

The radicals B in formulae II and III are derived from m-phenylenediamines and, preferably, from p-phenylenediamines of formulae

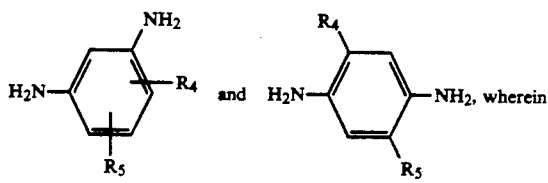

$R_4$ and $R_5$ have the meanings given above.

Exemplary of such diamines are: 1,4-diaminobenzene, 1,4-diamino-2-chlorobenzene, 1,4-diamino-2-bromobenzene, 1,4-diamino-2,5-dichlorobenzene, 1,4-diamino-2-methylbenzene, 1,4-diamino-2,5-dimethylbenzene, 1,4-diamino-2-methoxybenzol, 1,4-diamino-2,5-dimethoxybenzene, 1,4-diamino-2,5-diethoxybenzene, 2-chloro-5-methyl-1,4-phenylenediamine, 2-chloro-5-methoxy-1,4-phenylenediamine, 2-methyl-5-methoxy-1,4-phenylenediamine, 1,3-diaminobenzene, 1,3-diamino-2-methylbenzene, 1,3-diamino-4-chlorobenzene and 1,3-diamino-4-methylbenzene.

Typical diamines which are derived from the radical of formula

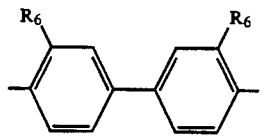

are:

3,3'-dichlorobenzidine, 3,3'-dibromobenzidine, 3,3'-dimethylbenzidine and 3,3'-dimethoxybenzidine.

Preferred compounds of formula I are those in which formula I has the following structure

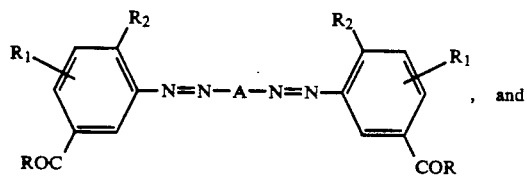

the groups R, $R_1$, $R_2$ and A are as defined above.

Also preferred are compounds of formula I, wherein formulae II and III have the following structures:

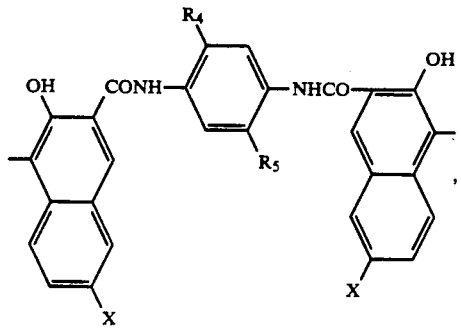

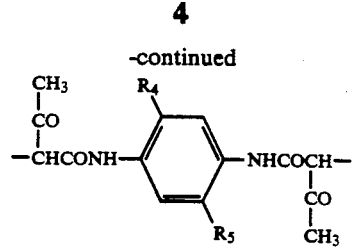

and the groups $R_4$, $R_5$ and X are as defined above.

Especially preferred are compounds of formula IV

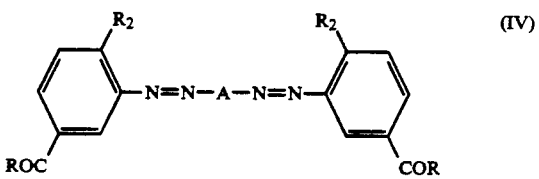

wherein A is a radical of formula V or VI

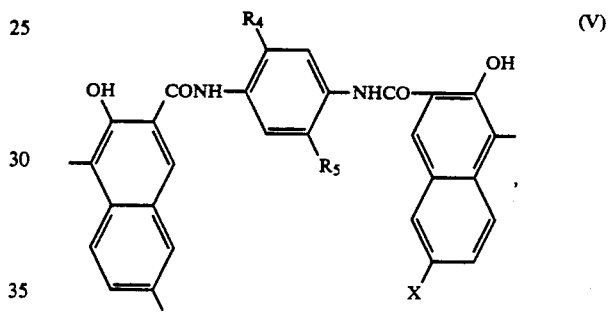

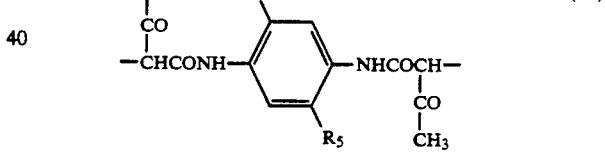

wherein R is a radical of formula $-OR_3$ or $-NHR_3$, and $R_2$ is $-H$, $-Cl$, $-CH_3$, $-OCH_3$, $-OC_2H_5$, $-COOCH_3$, $-COOC_2H_5$ or $-OC_6H_5$, $R_3$ is $C_5$-$C_6$cycloalkyl, and $R_4$ and $R_5$ are each independently of the other $-H$, $-Cl$, $-CH_3$, $-OCH_3$ or $-OC_2H_5$. R is most preferably a radical of formula $-NHR_3$.

In formula IV A is preferably a radical of formula V, most preferably a radical of formula V, wherein $R_4$ and $R_5$ are each independently of the other $-H$, $-Cl$, $-CH_3$ or $-OCH_3$. $R_2$ is preferably $-Cl$, $-CH_3$ or $-OCH_3$ and $R_3$ is cyclohexyl.

The compounds of formula I are preferably symmetrical compounds wherein both diazo components are identical. Asymmetrical compounds wherein both diazo components are different also fall within the definition of formula I.

The compounds of formula I can be prepared by processes which are known per se, conveniently by:

a) condensing 2 mol of a carbonyl halide, preferably a carbonly chloride, of formula

[Diagram: naphthalene-based azo compound with substituents $R_1$, $R_2$, COR$_n$, OH, COHal, X]

with a diamine of formula $H_2N-B-NH_2$, preferably $H_2N-\text{[phenyl with }R_4, R_2\text{]}-NH_2$ in accordance with U.S. Pat. No. 4,689,403, or by condensing 1 mol of a carbonyl halide of formula

[Diagram: bis-azo compound with (Hal—CO)$_n$, $R_1$, $R_2$, N=N—CHCONH—B—NHCOCH—N=N, CH$_3$/CO groups, (COHal)$_n$]

with 2 mol (n=1) or 4 mol (n=2) of a C$_5$-C$_{12}$cycloalkyl alcohol or C$_5$-C$_{12}$cycloalkylamine, in analogy to the method described in U.S. Pat. No. 4,065,448, or b) diazotising an amine of formula

[Diagram: $H_2N$—phenyl with $R_1$, $R_2$, (COR)$_n$]

and coupling the diazo component to a coupling component of formulae

[Diagram: bis-naphthol with CONH—B—NHCO bridge, X substituents]

,

[Diagram: $CH_3$/CO, $CH_2CONH-B-NHCO-CH_2$, CO/CH$_3$]

e.g. in accordance with U.S. Pat. No. 4,003,886, in which formulae above n, B, R, $R_1$ to $R_6$, Hal and X are as defined above.

The above coupling components and carbonyl halides are known intermediates.

A preferred process is the condensation reaction of scheme a). The condensation is conveniently carried out in the presence of an inert organic solvent under atmospheric or superatmospheric pressure, with or without a catalyst. Suitable solvents are typically toluene, chlorobenzene, dichlorobenzenes such as o-dichlorobenzene, and trichlorobenzenes, nitrobenzene or mixtures of aromatic and/or aliphatic solvents such as ®Shellsols.

The compounds of formula I can, however, also be prepared by means of a transesterification or transamidation reaction, comprising transesterifying or transamidating a compound of formula

[Diagram: $_n$(TOOC)—phenyl($R_1$, $R_2$)—N=N—A—N=N—phenyl($R_1$, $R_2$)—(COOT)$_n$]

wherein T is $C_1$-$C_3$alkyl, and the other symbols n, A, $R_1$ and $R_2$ are as defined above, with an alcohol or an amine of formula $R_3$—OH or $R_3NH_2$ by known processes to compounds of formula I. T is methyl, ethyl, propyl or isopropyl. Typical examples of the above mentioned alcohols and amines are:

Alcohols $R_3$—OH cyclopentanol
cyclohexanol
1-methylcyclopentanol
2-methylcylopentanol
3-methylcyclopentanol
cycloheptanol
1-methylcylohexanol
2-methylcyclohexanol
3-methylcohexanol
cis-4-methylcyclohexanol
trans-4-methylcyclohexanol
1-ethylcyclopentanol
3,3-dimethylcyclopentanol
cyclooctanol
1-ethylcyclohexanol
2-ethylcyclohexanol
3-ethylcyclohexanol
4-ethylcyclohexanol
2,4-dimethylcyclohexanol
2,6-dimethylcyclohexanol
1-n-propylcyclopentanol
1-n-propyl-1-cyclohexanol
1-isopropylcyclohexanol
4-isopropylcyclohexanol
2,4,6-trimethylcyclohexanol
α-decalol cis-2-decalol
trans-2-decalol
trans-4-cyclohexylcyclohexanol Amines $R_3—NH_2$ cyclopentylamine
cyclohexylamine
4-methylcyclohexylamine
4-tert-butylcyclohexylamine
cycloheptylamine
cyclooctylamine
cyclododecylamine.

The reaction is conveniently carried out direct in an excess of the appropriate alcohol or amine or in the presence of an organic solvent, typically toluene, a xylene, a dichlorobenzene, nitrobenzene, chloronaphthalene, anisole, ®Dowtherm, or a ketone such as cyclohexanone, at elevated temperature, conveniently in the boiling range of the solvent employed, under atmospheric or superatmospheric pressure, with or without a catalyst. If a catalyst is used it will suitably be sulfuric acid, p-toluenesulfonic acid, methylsulfonic acid, LiH, $LiNH_2$, $NaOCH_3$, potassium tert-butylate, tetraalkyl titanate, dibutyltin oxide or a rare earth.

The compounds of formula I are isolated in conventional manner, conveniently by filtration. The filter product is washed with one of the solvents mentioned above and then expediently again with water. They are usually obtained in good yield and purity and can be used without further purification in finely divided form for colouring high molecular weight organic material.

If their purity and/or particle shape and size for use as pigments is still not sufficient or optimal, the novel compounds can be further conditioned. By conditioning is meant the preparation of a finely particulate form most suited for application, conveniently by dry milling with or without salt, by solvent or aqueous milling or by salt kneading or by a thermal solvent aftertreatment.

Thermal solvent treatments can be carried out conveniently in organic solvents, preferably those which boil above 100° C.

Particularly suitable solvents for such aftertreatments are halobenzenes, alkylbenzenes or nitrobenzenes, including toluene, chlorobenzene, o-dichlorobenzene, xylenes or nitrobenzene, alcohols such as isopropanol or isobutanol, and also ketones such as cyclohexanone, ethers such as ethylene glycol monomethyl or monoethyl ether, amides such as dimethyl formamide or N-methylpyrrolidone, as well as dimethyl sulfoxide, sulfolane or water alone, under atmospheric or superatmospheric pressure. The aftertreatment can also be carried out in water in the presence of organic solvents and/or with the addition of surfactants or aliphatic amines, or in liquid ammonia.

Depending on the conditioning method and/or the envisaged utility it can be advantageous, before or after conditioning, to add specific amounts of texture improvers to the novel compounds of formula I. Particularly suitable texture improvers are fatty acids of at least 18 carbon atoms, typically stearic acid or behenic acid or their amides or metal salts, preferably magnesium salts, as well as plasticisers, waxes, resin acids such as abietic acid, rosin soap, alkyl phenols or aliphatic alcohols such as stearyl alcohol, or aliphatic 1,2-dihydroxy compounds of 8 to 22 carbon atoms, conveniently 1,2-dodecanediol, and also modified rosin maleate resins or fumaric acid rosin resins. The texture improvers are preferably added in amounts of 0.1–30% by weight, preferably of 2–15% by weight, based on the final product.

High molecular weight material may be of natural or synthetic origin. It may typically comprise natural resins or drying oils, rubber or casein or modified natural substances such as chlorinated rubber, oil-modified alkyd resins, viscose, cellulose ethers and esters, including cellulose acetate, cellulose propionate, cellulose acetobutyrate or nitrocellulose, but preferably the manmade organic polymers (thermosetting resins and thermoplastic resins) obtained by polymerisation, polycondensation or polyaddition. Polymers of the class of the polymerisation resins are in particular: polyolefins, typically polyethylene, polypropylene or polyisobutylene, and substituted polyolefins, including polymers of vinyl chloride, vinyl acetate, styrene, acrylonitrile, acrylates and/or methacrylates or butadiene, as well as copolymers of the cited monomers, especially ABS, EVA or acrylate-styrene-acrylonitrile (ASA).

Polymers of the class of the polyaddition resins and polycondensation resins are typically the condensates of formaldehyde with phenols, i.e. phenolic plastics, and the condensates of formaldehyde with urea, thiourea and melamine, i.e. aminoplastics, the polyesters used as surface-coating resins, viz. saturated polyesters such as alkyd resins as well as unsaturated polyesters such as maleate resins, and also the linear polyesters, polycarbonates, polyurethanes and polyamides or silicones.

The aforementioned high molecular weight materials may be singly or in mixtures in the form of plastics materials or of melts which may be spun to fibres.

They may also be in polymerised state in the form of solutions as film formers or binders for paints and varnishes or printing inks, for example boiled linseed oil, nitrocellulose, alkyd resins, melamine resins and urea/-formaldehyde resins or acrylic resins.

The pigmenting of the high molecular weight organic materials with the novel compounds of formula I is carried out typically by blending such a compound, which may be in the form of a masterbatch, into these substrates using roll mills or mixing or milling apparatus. The pigmented material is then brought into the desired final form by known methods such as calendaring, moulding, extruding, coating, spinning, casting or by injection moulding. It is often desirable to incorporate plasticisers into the high molecular weight compounds before processing in order to produce non-brittle mouldings or to diminish their brittleness. Suitable plasticisers are typically esters of phosphoric acid, phthalic acid or sebacic acid. The plasticisers may be incorporated before or after blending the pigment into the polymers. To obtain different shades it is also possible to incorporate fillers or other chromophoric components such as white, coloured or black pigments into the high molecular weight compounds in any desired amount, in addition to the novel compounds.

For pigmenting paints, varnishes and printing inks the high molecular weight organic materials and the compounds of formula I, together with optional additives such as fillers, other pigments, siccatives or plasticisers, are finely dispersed or dissolved in a common organic solvent or mixture of solvents. The procedure can comprise dispersing or dissolving the individual components by themselves, or also several jointly, in the solvent and subsequently mixing all the components.

The high molecular weight organic materials, typically plastics materials, fibres, paints, varnishes and printing inks, preferably contain 0.01 to 20% by weight of a novel compound of formula I. The novel compounds have good dispersibility and are fast to overspraying, migration, heat, light and weathering. They have good colour strength and the colorations obtained therewith have good gloss.

The compounds of formula I are, however, preferably used for colouring polyolefins.

Suitable polyolefins are typically high and low density polyethylene (HDPE, LDPE and LLDPE), polypropylene and polyisobutylene, as well as copolymers of polyolefins with e.g. polyethers, polyether ketones or polyurethanes.

Coloration is effected by standard methods, conveniently by blending a compound of formula I with a granulate or powder of the polyolefin and extruding the blend to fibres, sheets or granulates. These last-mentioned products can then be shaped by injection moulding to objects.

The colorations obtained have high purity and high saturation and have excellent dispersibility, good all-round fastness properties, especially fastness to heat and light, as well as an insignificant tendency to bloom. A particular advantage of polyethylene objects colored with the compounds of formula I is that, especially in the case of HDPE, they exhibit no increased tendency to warping and deformation. In addition they have superior resistance to acid.

Synthetic fibres, such as PP fibres, colored with the novel compounds of formula I have excellent textile properties, for example lightfastness and wetfastness to washing and solvents.

The following Examples will serve to illustrate the invention.

EXAMPLE 1

3.65 g of the disazodicarbonyl dichloride of formula

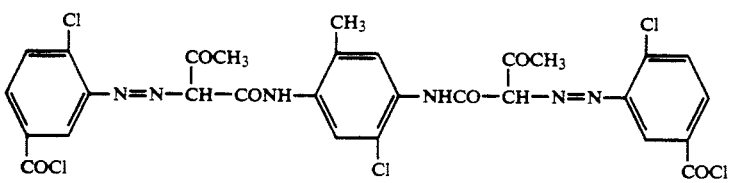

and 3.1 g of cyclohexylamine are heated in 150 ml of o-dichlorobenzene to 132° C. and stirred vigorously for 2 hours at this temperature. The yellow suspension is cooled to 80° C., at which temperature the product is filtered with suction, then washed with o-dichlorobenzene and hot methanol and dried at 60° C. under vacuum, giving 4.1 g (96.2% of theory) of a yellow powder of formula The product of this Example colours polyvinyl chloride having superior fastness to migration in strong greenish yellow shades of excellent light- and weatherfastness.

EXAMPLES 2–8

The following table lists further compounds which can be prepared by the process of Example 1, by coupling the diazo compound of 3-amino-4-chlorobenzoic acid to the bisacetoacetarylide of the diamines listed in column I and converting the dicarboxylic acid disazo colorant obtained into the corresponding dicarbonyl dichloride, and then condensing this acid chloride with the appropriate cycloamine or cycloalcohol listed in column II. The shade of the PVC sheet which is coloured with these pigments is indicated in column III.

| Ex. | I | II | III |
|---|---|---|---|
| 2 | 2,5-dimethyl-p-phenylenediamine | cyclohexylamine | yellow |
| 3 | 2,5-dichloro-p-phenylenediamine | cyclohexylamine | greenish yellow |
| 4 | 2,5-dimethyl-p-phenylenediamine | cyclopentylamine | yellow |
| 5 | 2,5-dimethyl-p-phenylenediamine | cycloheptylamine | yellow |
| 6 | 2,5-dimethyl-p-phenylenediamine | cyclooctylamine | yellow |
| 7 | 2,5-dimethyl-p-phenylenediamine | cyclohexyl alcohol | yellow |
| 8 | 2,5-dichloro-p-phenylenediamine | cyclohexyl alcohol | greenish yellow |

EXAMPLE 9

2.6 g of cyclohexyl 3-amino-4-methylbenzamide and 1.5 g of 2,5-dimethyl-1,4-diacetoacetylaminobenzene are heated to 60° C. in 200 ml of acetic acid. The clear yellow solution obtained is cooled to 57° C. and, at this temperature, 2.86 ml of a 4N solution of sodium nitrite are rapidly added dropwise, whereupon a dense orange precipitate forms. The orange suspension is stirred for 3 hours at 65° C. and filtered. The filter product is washed with 200 ml of 96% ethyl alcohol and dried at 60° C. under vacuum, giving 2.6 g (91% of theory) of a yellow ochre powder of formula

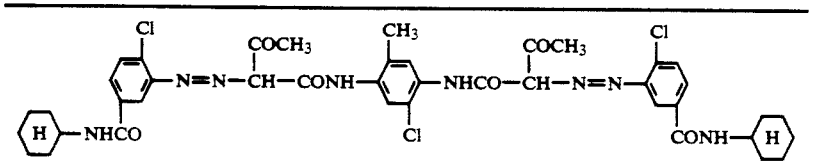

| Analysis: | C | H | Cl | N |
|---|---|---|---|---|
| calcd: | 57.78% | 5.32% | 12.48% | 13.15% |
| found: | 57.64% | 5.32% | 12.61% | 13.17% |

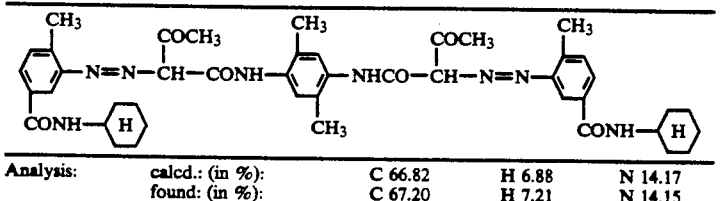

| Analysis: | calcd.: (in %): | C 66.82 | H 6.88 | N 14.17 |
|---|---|---|---|---|
| | found: (in %): | C 67.20 | H 7.21 | N 14.15 |

This product colours polyethylene, polyamide and polyvinyl chloride in strong shades. The heat resistance of these colorations is excellent.

EXAMPLES 10–14

The following table lists further compounds which are obtained by coupling the diazotised compound of a base of column I with a bisacetoacetarylide of a diamine of column II in the molar ratio 2:1. The shade of the PVC sheet coloured with these pigments is indicated in column III.

| Ex. | I | II | III |
|---|---|---|---|
| 10 | cyclohexyl 3-amino-4-chlorobenzoate | 2,5-diaminonaphthaline | yellow |
| 11 | cyclohexyl 4-aminobenzamide | 2-chloro-5-methyl-p-phenylenediamine | greenish yellow |
| 12 | cyclohexyl 4-aminobenzamide | 2,5-dimethyl-p-phenylenediamine | yellow |
| 13 | cyclohexyl 3-amino-4-methoxybenzamide | 2-chloro-5-methyl-p-phenylenediamine | yellow |
| 14 | cyclohexyl 3-amino-4-chlorobenzamide | 3,3'-dimethylbenzidine | yellow |
| 15 | dicyclohexyl 2-aminoterephthalamide | 2,5-dimethyl-p-phenylenediamine | greenish yellow |

EXAMPLE 16

5.3 g of the azo dye of diazotised cyclohexyl 3-amino-4-methylbenzoate and 2-hydroxy-3-naphthoic acid are suspended in 50 ml of anhydrous toluene. To the mixture are added 1 ml of thionyl chloride and 2 drops of dimethyl formamide, and the reaction mixture is heated 1 hour to 88° C. with stirring. The dark red solution is cooled to 40° C., whereupon a red precipitate forms. This precipitate is filtered with suction, washed with 200 ml of petroleum ether and dried at 60° C. under vacuum, giving 4.3 g (95.6% of theory) of the carbonyl chloride azo colorant of formula

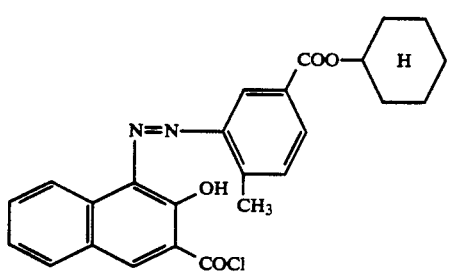

with a melting point of 188°–190° C.

Analysis: calc.(in %): C66.59, H5.14, Cl7.86, N6.21%. found(in %): C66.64, H5.10, Cl7.70, N6.09%.

3.45 g of the carbonyl chloride azo colorant are stirred in 80 ml of anhydrous o-dichlorobenzene and heated to 80° C. To the clear red solution is added at this temperature a warm solution of 80° C. of 0.5 g of 2,5-dimethyl-1,4-phenylenediamine in 50 ml of o-dichlorobenzene, whereupon a dark red precipitate forms. The dark red suspension is heated, with stirring, to 116° C. and stirring is continued for 16 hours at this temperature. The product is collected by suction filtration at 60° C., washed with chlorobenzene and with hot methanol and dried, giving 3.5 g (95% of theory) of a soft-grained, reddish brown powder which colours e.g. polyvinyl chloride in a red shade of excellent fastness to migration, heat and light. The pigment conforms to the following structural formula

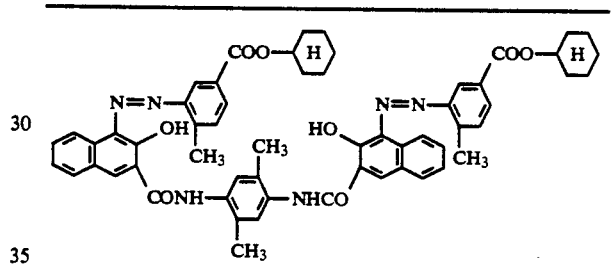

| Combustion analysis: | calcd. (in %): | C 72.18 | H 5.85 | N 8.71 |
|---|---|---|---|---|
| | found (in %): | C 71.86 | H 5.78 | N 8.30 |

The carboxylic acid azo colorant (starting material for obtaining the acid chloride) can be synthesised as follows: 3.5 g of cyclohexyl 3-amino-4-methylbenzoate and 2.8 g of 2-hydroxy-3-naphthoic acid are dissolved at 24° C. in a mixture of 25 ml of toluene, 5 ml of acetic acid and 40 ml of 96% ethyl alcohol. To the clear brown solution are added 2 ml of of tert-butyl nitrite. The temperature rises to 32° C. and a red precipitate forms. The red suspension is stirred for 4 hours without heating. The product is collected by suction filtration at room temperature, washed with 200 ml of 96% ethyl alcohol and dried at 60° C. under vacuum, giving 5.9 g (90% of theory) of a brownish red powder with a melting point of 248°–250° C. The pigment conforms to the structural formula

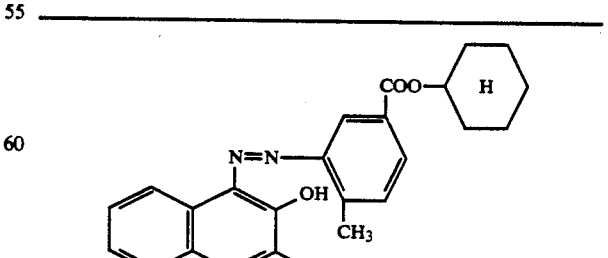

| Analysis: | calcd.: (in %): | C 69.59 | H 5.37 | N 6.49 |
|---|---|---|---|---|
| | found: (in %): | C 69.37 | H 5.63 | N 6.44 |

EXAMPLES 17-30

The following table lists further pigments which may be prepared by the process of the foregoing Example by coupling the diazo compound of the amines listed in column I to 2-hydroxy-3-naphthoic acid, then converting the carboxylic acid azo colorant obtained into the acid chloride, and condensing this acid chloride with the diamines of column III in the molar ratio 2:1. The shade in which polyvinyl chloride is coloured according to Example 32 with these pigments is indicated in column III.

| Ex. | I | II | III |
|---|---|---|---|
| 17 | cyclohexyl 3-amino-4-chlorobenzoate | 2,5-dimethyl-p-phenylenediamine | maroon |
| 18 | cyclohexyl 3-amino-4-methoxybenzoate | 2,5-dimethyl-p-phenylenediamine | violet |
| 19 | cyclohexyl 3-amino-4-chlorobenzoate | 2,5-dichloro-p-phenylenediamine | reddish orange |
| 20 | cyclohexyl 3-amino-4-methylbenzoate | 2,5-dichloro-p-phenylenediamine | red |
| 21 | 3',5'-dimethyl-cyclohexyl 3-amino-4-methylbenzoate | 2,5-dichloro-p-phenylenediamine | red |
| 22 | 3',5'-dimethyl-cyclohexyl 3-amino-4-methylbenzoate | 1,4-phenylenediamine | red |
| 23 | cyclohexyl 3-amino-4-methylbenzamide | 2,5-dimethyl-p-phenylenediamine | crimson |
| 24 | cyclohexyl-3-amino-4-methoxybenzamide | 2,5-dimethyl-p-phenylenediamine | crimson |
| 25 | cyclopentyl 3-amino-4-methylbenzamide | 2,5-dichloro-p-phenylenediamine | red |
| 26 | cyclohexyl 3-amino-4-chlorobenzamide | 2,5-dichloro-p-phenylenediamine | orange red |
| 27 | cyclohexyl 3-amino-4-methylbenzamide | 2,5-dichloro-p-phenylenediamine | scarlet |
| 28 | cycloheptyl 3-amino-4-methylbenzamide | 2,5-dichloro-p-phenylenediamine | red |
| 29 | cyclooctyl 3-amino-4-methylbenzamide | 2,5-dichloro-p-phenylenediamine | orange red |
| 30 | cyclohexyl 3-amino-4-methoxybenzamide | 2,5-dichloro-p-phenylenediamine | magenta |

EXAMPLE 31

A mixture of 1.0 g of the disazo condensation pigment obtained according to Example 1, 1.0 g of antioxidant ®IRGANOX 1010 (CIBA-GEIGY AG) and 1000 g of HD polyethylene granules (®VESTOLEN A60-16, HUELS) is stirred for 15 minutes in a 3 liter glass bottle on a roller gear table. The mixture is then extruded in two passes in a single screw extruder. The granulate so obtained is moulded to boards at 250° C. in an injection moulding machine (®Allround Aarburg 200) for 5 minutes. The boards are couloured in a strong, level greenish yellow shade of high purity and excellent lightfastness.

EXAMPLE 32

40 mg of the disazo condensation pigment obtained according to Example 1, 7.3 ml of dioctyl phthalate and 13.3 g of stabilised polyvinyl chloride ®LONZA E-722 are thoroughly mixed in a glass beaker with a glass rod, and the mixture is processed to a thin sheet on a roll mill for 5 minutes at 160° C. The PVC sheet so obtained is coloured in a very strong greenish yellow shade of high purity and very good lightfastness. The dispersibility of the pigment is excellent.

EXAMPLE 33

1000 g of polypropylene granules ®DAPLEN PT-55, Chemie LINZ) and 1.0 g of the disazo condensation pigment obtained according to Example 1 are mixed for 15 minutes in a 3 liter bottle on a roller gear bed. The mixture is subsequently extruded twice through a single-screw extruder and then granulated. The granules so obtained are spun at 280°-285° C. by the melt spinning process. The coloured filaments have very good lightfastness and excellent textile properties, such as rubfastness and wetfastness to detergents and solvents. The pigment has excellent heat resistance during the spinning process at 285° C.

EXAMPLE 34

100 g of polyamide ®GRILON A 25 (EMS-Chemie AG, Zürich) and 0.2 g of the disazo condensation pigment obtained according to Example 1 are well mixed for 20 minutes on a laboratory high turbulence mixer (supplied by W. A. Bachofen, Basel). The mixture is then extruded at 240° C. in a single-screw extruder. The ribbon so obtained is coloured in a greenish yellow shade and has good lightfastness properties.

EXAMPLE 35

The process described in Example 31 is repeated, but using, in addition to the coloured pigment, 10 g of titanium dioxide ®KRONOS RN-57-P (KRONOS Titan GmbH), to give greenish yellow pressed sheets having comparably good heat resistance. The pressed sheets, which are injection moulded at 200°-280° C., exhibit no colour deviations after cooling.

What is claimed is:

1. A compound of the formula

wherein
A is a radical of formula VI

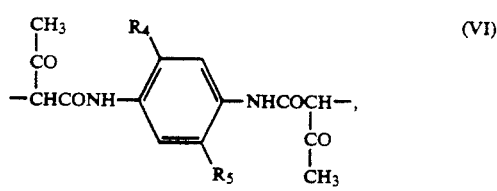

$R_2$ is Cl, $CH_3$, or $OCH_3$
$R_3$ is $C_5$-$C_6$cycloalkyl
$R_4$ and $R_5$ are each independently of the other H, Cl, $CH_3$, $OCH_3$ or $OC_2H_5$.

2. A compound of claim 1 having the formula

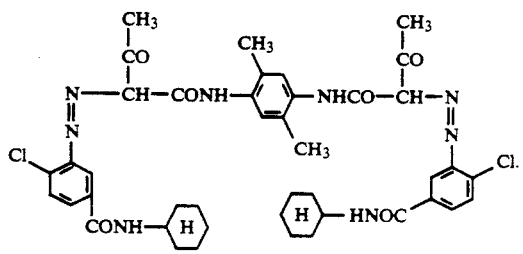

* * * * *